Figure 1:
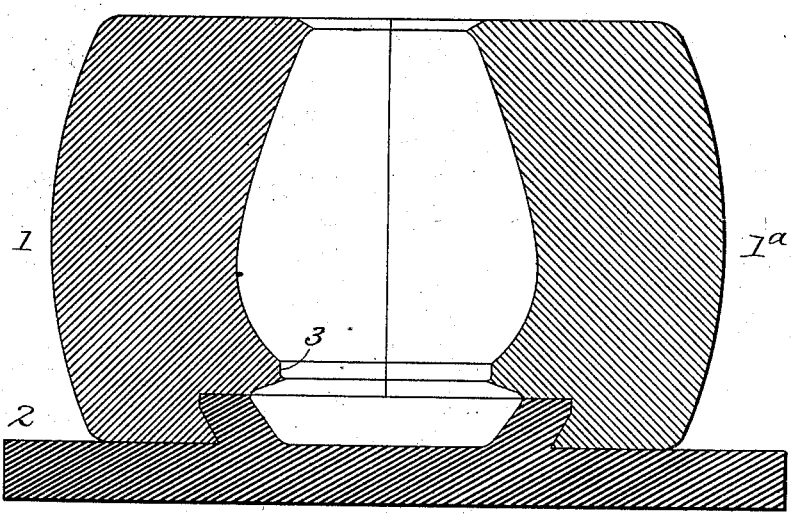

No. 717,501.  
A. B. HOUGHTON.  
MANUFACTURE OF LANTERN GLOBES.  
(Application filed July 17, 1901.)  
Patented Dec. 30, 1902.

(No Model.)  
2 Sheets—Sheet 1.

Witnesses  
C. B. Bull  
Charles H. Howard

Inventor  
Alanson B. Houghton  
by Gtt W. T. Mraid  
Attorneys

No. 717,501. Patented Dec. 30, 1902.
A. B. HOUGHTON.
MANUFACTURE OF LANTERN GLOBES.
(Application filed July 17, 1901.)
(No Model.) 2 Sheets—Sheet 2.
Fig. 2.
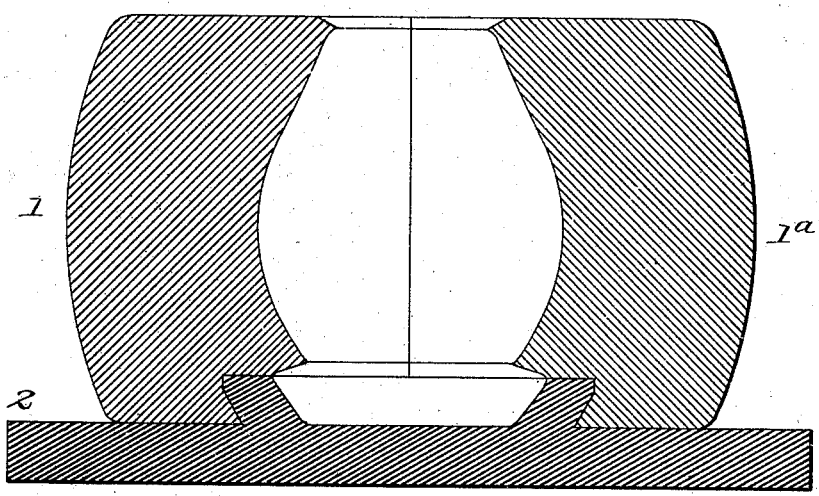
Fig. 4.  Fig. 5.
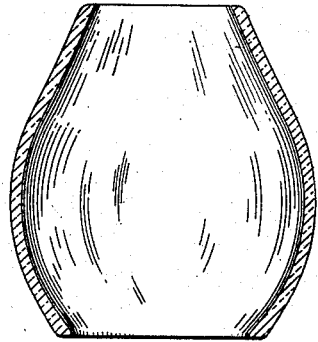 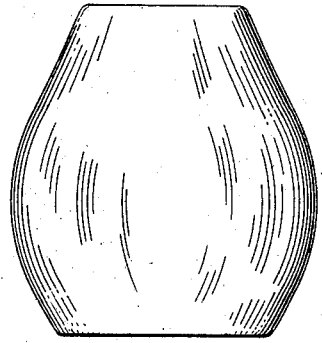
Witnesses
C. B. Bull
Charles L. Howard
Inventor
Alanson B. Houghton
by Attorneys.

UNITED STATES PATENT OFFICE.

ALANSON B. HOUGHTON, OF CORNING, NEW YORK, ASSIGNOR TO CORNING GLASS WORKS, OF CORNING, NEW YORK, A CORPORATION OF NEW YORK.

MANUFACTURE OF LANTERN-GLOBES.

SPECIFICATION forming part of Letters Patent No. 717,501, dated December 30, 1902.

Application filed July 17, 1901. Serial No. 68,659. (No model.)

*To all whom it may concern:*

Be it known that I, ALANSON B. HOUGHTON, a citizen of the United States, residing at Corning, in the county of Steuben and State of New York, have invented a new and useful Improvement in the Manufacture of Lantern-Globes, of which the following is a full, clear, and exact description, reference being had to the accompanying drawings and to the numerals of reference marked thereon.

My invention relates to a method or process of making a lantern-globe, consisting in subjecting the blank to pressure only in the direction of the natural flow of the glass under expansion. When pressure is exerted upon a blank or body of glass at the end of a blowpipe, such body assumes a positive and certain formation due to gravity and pressure, which shape is substantially that of a pear, and in carrying out my method while a mold is used it exercises little or no influence in the shaping of the globe, but acts more especially, if not entirely, as a medium for limiting the extent of expansion of the glass under pressure, so that the mold may be termed rather a "size-controller" than a means of formation. Under my invention, in which the globe produced is not provided with a bottom flange or ring, the glass is not subjected to choking at an angle, but is expanded evenly only to the natural shape it takes due to the internal air-pressure applied, the globe having throughout a shape that simply conforms to the natural and unimpeded flow, or rather expansion, of the glass in shaping under pressure. A principal reason for the omission of the bottom flange or ring is therefore to prevent the formation of an angle in the wall of the globe, which has been a prime source of weakness therein. Furthermore, by the method heretofore employed, owing to the excess of pressure necessary to blow the glass to the shape of the mold and into the bottom angle, there has been lack of uniformity in the thickness of the walls of the globe, this fact greatly tending to weakness, whereas in the practice of my improved process, owing to the circumstance that my globe is of the shape that the glass naturally assumes in blowing and the uniformity of pressure employed in the formation of the globe with walls having lines of curvature natural to the simple expansion of the glass without an angular break in such curvature, the walls are of equal thickness throughout.

The advantages accruing from my improved method are, from a practical point of view, very considerable and have been demonstrated in practical tests and actual working. Thus it is highly necessary that a lantern-globe which is exposed to a great diversity of temperatures ranging from many degrees below zero to a high degree of natural atmospheric heat and to the heat due to the flame should be adapted to withstand sudden and almost infinite variations of temperature, as well as the destructive action of the elements—as of wind, rain, snow, &c.—and the rough usage to which it is subjected. Therefore it becomes essential that it should have throughout its entire body the greatest attainable degree of strength, and particularly such as is uniform in all parts of the body, and should be deprived of structural weakness at all points. After exhaustive experiments and actual tests I have arrived at the conclusion that the practice heretofore employed of making a flange or ring at the bottom of the globe is the greatest source of weakness in the globe, because in order to blow the glass into the angle at the flange great pressure is necessary, far greater than the normal pressure required to shape a globe not having any abrupt or angular lines of contour. My improved method, therefore, is so designed that the flow or expansion of glass within the mold shall be natural and unimpeded and the pressure in blowing uniform throughout and not excessive, resulting in the production of a globe having the distinctive characteristics and advantages pointed out.

The ordinary process or method of manufacturing lantern-globes being understood by those skilled in the art and my improved method or process differing therefrom only in the particulars herein pointed out, it is not necessary to describe it in detail. It will be understood that, as heretofore, the body of molten glass adhering to the blowpipe is expanded by air blown through the pipe, the bloom or blank thus formed being then placed within the mold, the side walls of the latter being of the shape naturally assumed by the expanded blank and finally blown to the size of the interior thereof, which is that required for the size of the globe. The globe is then withdrawn from the mold, passed through an annealing-oven, and the surplus glass at the top and bottom is removed by a grinding, filing, or other suitable operation, when the globe is ready for use. A mold of any approved description, as a two-part mold with a base-plate, may be employed, it being only necessary that such a mold shall be used as under the blowing shall admit of the production of the novel features constituting my invention.

Figure 3:
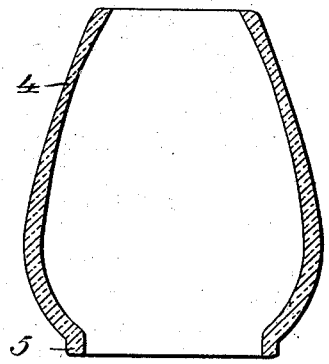

In the accompanying drawings, Figure 1 shows in section a two-part iron mold adapted to produce a lantern-globe of the shape or conformation heretofore generally in use. Fig. 2 is a similar view illustrating a mold capable of being employed in conducting my invention. Fig. 3 is a sectional view of the ordinary globe representing a defect in its manufacture. Fig. 4 is a similar section, and Fig. 5 an exterior view of a globe made under my improved method.

Similar numerals of reference indicate similar parts in the respective figures.

Let 1 1ª indicate sections of a two-part mold, and 2 a base-plate. By reference to Fig. 1 it will be seen that the mold is provided with an annular stepped shoulder or internal projection 3, which enables a ring or flange 5, Fig. 3, to be formed at the juncture with the curve or bulge of the globe, whereas in Fig. 2, which represents a mold adapted to carry out my invention, the step or shoulder 3 is absent and the shape of the mold is substantially that of the expanded blank.

Fig. 3, which is a longitudinal sectional view of the ordinary and heretofore-approved type of globe, shows the walls at 4 thinner than at the upper and lower parts, this diminution in thickness being due to the irregularity of pressure required in the blowing or molding, because of the choking of the glass at the angle between the curved body and the flange or ring 5. While the pressure heretofore employed has been irregular, it has also been excessive, due to the difficulty found in blowing the glass into the angle. Fig. 3 may show the thinness of the globe at 4 in a somewhat exaggerated degree; but this is done better to illustrate the feature referred to. In Fig. 4, which shows a similar section of a globe made under my invention, the lower flange or ring 5 is omitted, the mold being of the natural shape of the expanded glass, and as a consequence the flow or expansion of the glass in molding being natural and unimpeded the walls are not only kept uniform in thickness, and therefore of equal strength at all points, but the same solidity and density of glass entering into the globe are maintained at all parts. The surplus glass, as will be understood, extends above the mold, while a thin cup-shaped surplus of glass is formed in the base of the mold, both of which extraneous bodies of glass are removed, as stated.

It is obvious that my invention may be carried out by the workman blowing through the blowpipe or by pressure artificially produced, and if mechanical appliances are used to this end they may be of any known and approved description. However applied, the pressure employed is uniform, no excess of pressure being required in molding any part of the globe, and in consequence the stretching or compressing of any part of the walls of the globe is avoided. The globe made under this method is of equal density throughout, no change being effected in normal molecular conditions.

The mold herein shown is not intended to arbitrarily illustrate the type adapted for use in the practice of my invention, as other approved types may be substituted, it being obvious that the skilled mechanic, without the exercise of invention, may readily construct varied molds and apparatus adapted to the purpose in view, provided that the shape of the mold be substantially that of the blank expanded by internal air-pressure.

Having thus described my invention, I claim—

1. The method or process herein described of making a lantern-globe, which consists in subjecting the blank to pressure only sufficient to effect the flow of glass in the curved line of natural expansion under such pressure, substantially as set forth.

2. The method or process herein described of making a lantern-globe, which consists in subjecting the blank to a uniformity of pressure only in the direction of the natural flow of the glass under expansion, whereby the choking of the glass at any point in the body of the globe is prevented, substantially as set forth.

3. The method or process herein described of making a lantern-globe without a flange or ring at its bottom which consists in subjecting the blank to pressure only sufficient to effect the flow of glass in the curved line of natural expansion under such pressure and removing the surplus glass from the bottom of the blank so expanded thereby producing a globe without a bottom flange or ring, substantially as set forth.

In testimony whereof I hereunto set my hand and seal.

ALANSON B. HOUGHTON. [L. S.]

Witnesses:
W. J. TULLY,
WM. SINCLAIRE.